(12) United States Patent
Will et al.

(10) Patent No.: US 9,053,433 B2
(45) Date of Patent: Jun. 9, 2015

(54) ASSISTING VEHICLE GUIDANCE OVER TERRAIN

(75) Inventors: Julia Vivien Will, Clifton (GB); Richard Arthur Brimble, Stoke Bishop (GB)

(73) Assignee: BAE SYSTEMS, plc (GB)

( * ) Notice: Subject to any disclaimer, the term of this patent is extended or adjusted under 35 U.S.C. 154(b) by 249 days.

(21) Appl. No.: 13/702,765

(22) PCT Filed: Jul. 5, 2011

(86) PCT No.: PCT/GB2011/001008
§ 371 (c)(1),
(2), (4) Date: Dec. 7, 2012

(87) PCT Pub. No.: WO2012/004553
PCT Pub. Date: Jan. 12, 2012

(65) Prior Publication Data
US 2013/0080359 A1 Mar. 28, 2013

(30) Foreign Application Priority Data

Jul. 6, 2010 (EP) ..................................... 10275070
Jul. 6, 2010 (GB) ................................... 1011364.5

(51) Int. Cl.
*G06F 15/18* (2006.01)
*G06N 99/00* (2010.01)
*B60W 40/06* (2012.01)
*G01C 21/00* (2006.01)
*G06K 9/00* (2006.01)
(Continued)

(52) U.S. Cl.
CPC .............. *G06N 99/005* (2013.01); *G06N 3/088* (2013.01); *G06N 3/0675* (2013.01); *B60W 40/06* (2013.01); *B60W 50/0097* (2013.01); *B60W 2050/146* (2013.01); *G01C 21/005* (2013.01); *G06K 9/00697* (2013.01)

(58) Field of Classification Search
CPC .......... B60W 2050/146; B60W 40/06; B60W 50/0097; G06K 9/00697; G06N 3/0675; G06N 3/088
See application file for complete search history.

(56) References Cited

U.S. PATENT DOCUMENTS

2007/0280528 A1 12/2007 Wellington et al.
2010/0021052 A1 1/2010 Wellington et al.

FOREIGN PATENT DOCUMENTS

WO WO 2005/088521 A1 9/2005
WO WO 2007/020456 A2 2/2007

OTHER PUBLICATIONS

'A Bayes-Maximum Entropy Method for Multi-Sensor Data Fusion': Beckerman, 1992, IEEE, pp. 1668-1674.*

(Continued)

*Primary Examiner* — Kakali Chaki
*Assistant Examiner* — Peter Coughlan
(74) *Attorney, Agent, or Firm* — Finch & Maloney PLLC

(57) ABSTRACT

A method and system for assisting with guiding a vehicle over terrain is provided. The method includes training at least one first classifier technique using a first set of terrain classifier training data, such that the at least one first classifier technique is trained to output at least one probability value usable to classify terrain. The first trained classifier technique is then used to generate a second set of terrain classifier training data. A second classifier technique is trained using the output of the at least one first classifier technique, and additional data to output a probability value useable to classify terrain.

12 Claims, 5 Drawing Sheets

(51) Int. Cl.
  G06N 3/08    (2006.01)
  G06N 3/067   (2006.01)
  B60W 50/00   (2006.01)
  B60W 50/14   (2012.01)

(56) References Cited

OTHER PUBLICATIONS

'Seif-Supervised 'l errain Classitication for Planetary Rovers': Brooks, NASA science technology conference (NSTC2007) 2007 XP-009141175.*
'Experimental Results from a Terrain Adaptive Navigation System for Planetary Rovers': Helmick, 2008, diva-portal.*
'A reinforcement learning with evolutionary state recruitment strategy for autonomous mobile robots control': Kondo, 2004, Elsevier, pp. 111-124.*
'Quantifying Uncertainty Towards Information-Centric Unmanned Navigation': Madhavan, 2003, National Institute of Standards and Technology (NIST), Intelligent Systems Division.*
'Comparison Between Radial Basis Function Neural Network and Regression Model for Estimation of Rice Biophysical Parameters Using Remote Sensing': Yang, 2009, Soil Science Society of China, pp. 176-188.*
'Terrain Parameter Estimation and Traversability Assessment for Mobile Robots': Kang, 2003, MIT.*
International Search Report (PCT/ISA/210) issued on Oct. 24, 2011, by the United Kingdom Patent Office as the International Searching Authority for International Application No. PCT/GB2011/001008.
Written Opinion (PCT/ISA/237) issued on Oct. 24, 2011, by the by the United Kingdom Patent Office as the International Searching Authority for International Application No. PCT/GB2011/001008.
United Kingdom Search Report issued on Oct. 25, 201 for Application No. GB1011364.5.
European Search Report issued on Dec. 10, 2010 for Application No. 10275070.0.
Christopher A. Brooks et al., "Self-Supervised Terrain Classification for Planetary Rovers", Proc. NASA Science Technology Conference (NSTC2007), Jun. 1, 2007, pp. 1-8, XP-009141175.
Ibrahim Hilatci et al., "Terrain Classificatin and Classifier Fusion for Planetary Exploration Rovers", Aerospace Conference, 2007 IEEE, Mar. 3, 2007, pp. 1-11, XP-031214278.
International Preliminary Report on Patentability (PCT/IB/373) issued on Jan. 8, 2013, by the United Kingdom Patent Office for International Application No. PCT/GB2011/001008.
Ibrahim Halatci et al., "A Study of Visual and Tactile Terrain Classification and Classifier Fusion for Planetary Exploration Rover", Robotica, vol. 26, Jan. 1, 2008, pp. 767-779, XP-009141109.
Ibrahim Halatci et al., "A study of visual and tactile terrain classification and classifier fusion for planetary exploration rovers", Robotica, vol. 26, XP009141109, 2008, pp. 767-779.
Michael Montemerlo et al., "Winning the DARPA Grand Challenge with an AI Robots", Journal of Field Robotics, 2006, 6 pages.
Les Piegl et al., "The NURBS Book", Springer-Verlag, Second Edition, 1997, 49 pages.
Carl Edward Rasmussen et al., "Gaussian Processes for Machine Learning", The MIT Press, 2006, 269 pages.

\* cited by examiner

■ - Un-classified  ☐ - Tarmac  ■ - Concrete  ☐ - Gravel

A) Gravel Track

B) Concrete Track

C) Concrete Track

D) Tarmac Track

Probability of Concrete

Probability of Gravel

Probability of Tarmac

Probability of Concrete

Probability of Gravel

Probability of Tarmac

ASSISTING VEHICLE GUIDANCE OVER TERRAIN

BACKGROUND TO THE INVENTION

The present invention relates to assisting vehicle guidance over terrain.

Technology can provide assistance for vehicles traversing terrain, including military personnel travelling in unfamiliar or harsh territory. Such technological aids include driver aids, tele-operation and autonomy. One approach to providing such a system is to detect and reason over higher-order terrain characteristics, such as terrain geometry and terrain type. This can enable automated intelligent planning and guidance of vehicles through upcoming un-traversed terrain.

OBJECTS OF THE INVENTION

Embodiments of the present invention are intended to address at least some of the issues discussed above.

Embodiments of the present invention seek to predict the behaviour of a vehicle on upcoming terrain, including providing the ability to predict how the vehicle will respond if it were to traverse that upcoming terrain. Such predictions can be used to support intelligent path planning in autonomous vehicles and may also be useful for driver assistance systems in manned or tele-operated vehicles.

Embodiments of the invention use data provided by onboard sensors to perceive higher-order characteristics of local terrain (e.g. terrain gradient, terrain type) and apply machine learning techniques to learn how to infer key vehicle response parameters (e.g. vehicle vibration, vehicle roll).

SUMMARY OF THE INVENTION

According to a first aspect of the present invention there is provided a method of assisting vehicle guidance over terrain, the method including:

training at least one first classifier technique using a first set of terrain classifier training data, such that the at least one first classifier technique is trained to output at least one probability value usable to classify terrain;

using the at least one first trained classifier technique to generate a second set of terrain classifier training data, and training a second classifier technique using the output of the at least one first classifier technique for the second set of terrain classifier training data, and additional data including an image-based representation of the terrain of the second data set, such that the second classifier technique is trained to output a probability value useable to classify terrain.

The at least one first classifier technique may comprise a Gaussian Process technique. There may be a plurality of the first classifier techniques, each of the techniques configured to classify a particular type of terrain and provide a probability value associated with certainty of that classification.

The second classifier technique may comprise a Regression Model technique and in some embodiments may comprise a Radial Basis function.

The first terrain classifier training data set may comprise terrain data from terrain traversed by a vehicle, e.g. terrain in a Now field of the vehicle. The second terrain classifier training data set may comprise terrain data from terrain to be traversed, e.g. terrain in a Near field of the vehicle.

The method may comprise processing data obtained from terrain sensors, which may be located onboard a vehicle, in order to produce the first terrain classifier training data set. Low-level terrain features may be extracted from data acquired from these terrain sensors as the first set of terrain classifier training data. The first terrain classifier training data set may therefore comprise data relating to pitch, roll, etc. of the terrain.

The image-based representation data may comprise video, photographic, LIDAR or infra-red representation of the terrain in the second data set.

The method may further include using the second trained classifier technique to classify terrain over which a vehicle may traverse. The output of the second classifier technique may be used to guide the vehicle.

The method may further include using the second trained classifier technique to assist with deciding whether the vehicle is to traverse upcoming terrain. The output of the second trained classifier technique may be used as a node in a Bayesian Network configured to provide data useful for generating a measure of traversability of terrain. The Bayesian Network may be trained using data corresponding to terrain characteristic data inputted into the second classifier technique. The output of the second classifier technique may be used when using the Bayesian network to predict the terrain type. The Bayesian Network can include nodes corresponding to at least one terrain characteristic and at least one vehicle state characteristic. The nodes may be selected from a set including: weather; terrain type; slope pitch; slope roll, vehicle speed; radius of curvature; slip; vibration roll and/or vibration pitch.

The method may further include inputting the output of the second trained classifier technique (for a third terrain data set) to a Bayesian Network configured to provide data useful for generating a measure of traversability of terrain. Data describing terrain characteristics of the third terrain data set may also be inputted to the Bayesian Network.

The method may further include using the terrain characteristics data set to train the Bayesian Network. The terrain type node may be based on data output by the second classifier technique. The Bayesian Network may further include a node corresponding to weather conditions that can affect the vehicle/terrain.

According to another aspect of the present invention there is provided a method of assisting vehicle guidance, the method including:

entering data representing characteristics of terrain over which a vehicle can traverse into a Bayesian Network configured to provide a data useful for generating a measure of traversability of terrain, and using the Bayesian Network to generate a measure of traversability of terrain.

The generated measure of traversability of terrain may be used to guide the vehicle.

According to yet another aspect of the present invention there is provided a computer program product comprising a computer readable medium, having thereon computer program code means, when the program code is loaded, to make the computer execute methods substantially as described herein.

According to other aspects of the present invention there are provided systems configured to execute methods substantially as described herein.

The sensor may include LIDAR, RADAR or image-based sensors.

According to another aspect of the present invention there is provided a vehicle including at least part of a system substantially as described herein.

The vehicle may be an at least partially autonomous vehicle.

Computer program products and apparatus configured to execute the methods described herein are also provided.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

DESCRIPTION OF THE DRAWINGS

The invention may be performed in various ways, and, by way of example only, embodiments thereof will now be described, reference being made to the accompanying drawings in which.

DESCRIPTION OF THE PREFERRED EMBODIMENT

Figure 1:
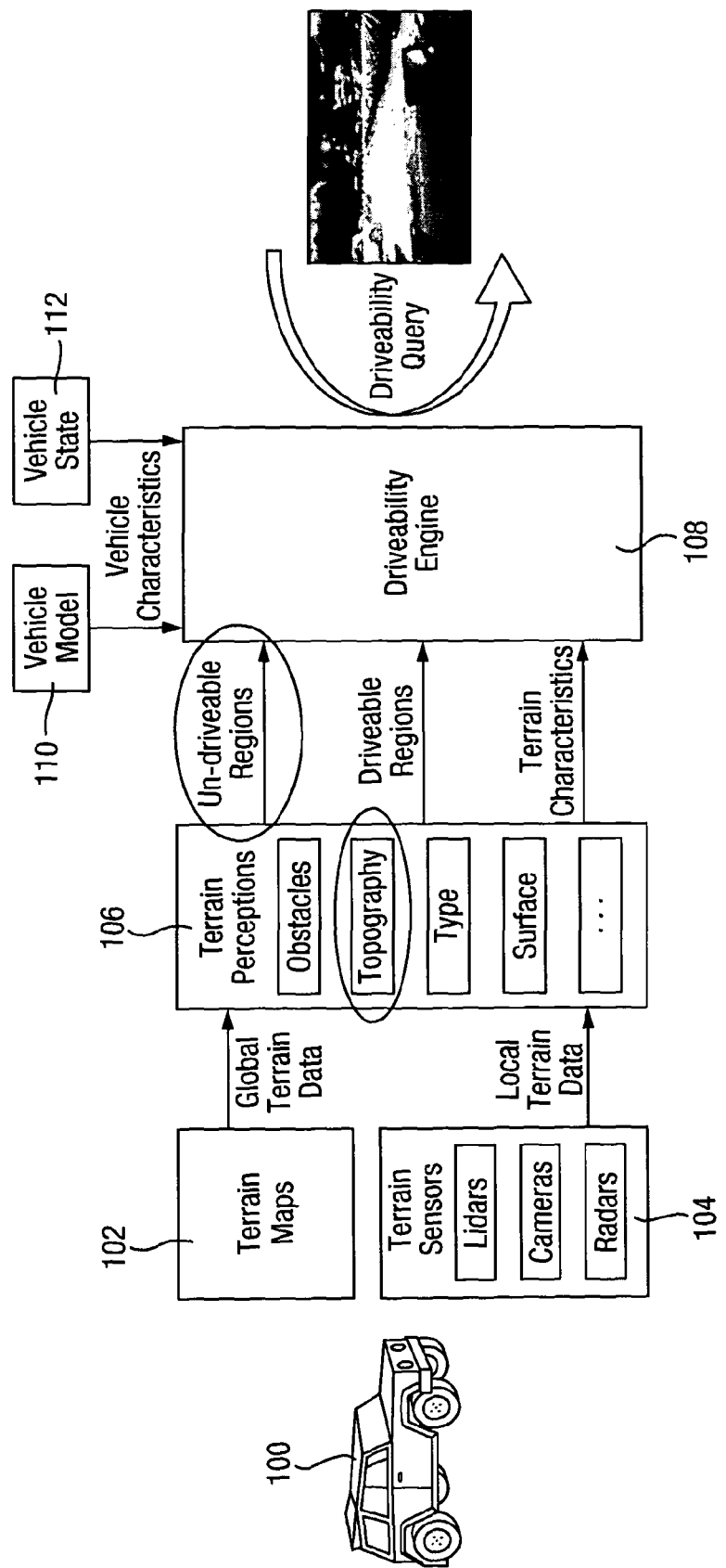
FIG. 1 is a schematic illustration of example architecture for an autonomous vehicle controller.

FIG. 1 shows a vehicle 100 along with a diagram schematically illustrating components of a controller that can assist with autonomous driving of the vehicle. Although a full size land vehicle is shown in the example, it will be appreciated that the system and processes described herein can be implemented on other types of vehicles.

The controller receives inputs including terrain maps 102, which provide global terrain data, and signals from at least one terrain sensor 104 that provide local terrain data (i.e. data derived from sensors onboard the vehicle). The sensors may be proprioceptive (measuring the internal state of the vehicle) or exteroceptive (measuring the external state of the environment). In some embodiments, data from both types of sensors, e.g. ones connected to an Inertial Navigation System, are used to give observations of the vehicle, LIDARs and stereo cameras giving range measurements immediately ahead of the vehicle, and a camera giving terrain appearance observations at longer ranges.

The inputs 102, 104 are received by a terrain perceptions component 106 that processes them to determine characteristics of the present terrain, e.g. whether there are any obstacles in the vicinity; the topography; and the type of terrain (e.g. mud, sand, etc).

The terrain perceptions component can produce one or more output, e.g. data describing un-driveable regions, data describing driveable regions and/or data describing terrain characteristics. These outputs are passed to a Drivability engine 108, responsible for functions such as predicting vehicle response on uneven terrain. The Drivability engine 108 can also receive input in the form of vehicle model data 110 (which models characteristics of the vehicle, such as tyre models, tip-over limits and kinematic/dynamic constraints) and vehicle state data 112 (which can include, for example, the planned velocity of the vehicle, the state of its steering mechanism, and pose including position, orientation and associated velocities and accelerations, etc). The engine 108 can receive a driveability query, e.g. generated by a route planning component (not shown) for the vehicle 100, and return an answer to that, e.g. an indication whether or not a proposed route is driveable.

In order to assist with guiding the vehicle over the terrain, embodiments of the system can provide automatic semantic labelling of terrain directly in front of a vehicle according to the terrain type (e.g. grass, mud, tarmac). In some embodiments this can be used as input to the Drivability engine in order to predict the likely response of the vehicle on upcoming un-traversed terrain to enable intelligent path planning. Conventionally, such techniques are supervised methods and thus need training data in the form of labelled images, which are notoriously labour-intensive and time consuming to produce by hand. A solution to this problem devised by the inventors involves:

- Conceptually dividing the area around the vehicle into a Now field, a Near field and a Far field
- Developing a Now field classifier that can automatically determine the type of terrain the vehicle is currently traversing; i.e. the terrain current under the wheels of the vehicle.
- Using the results of the Now field classifier to generate data to train a Near field classifier. This can be achieved by projecting the results generated by the Now field into a region of interest of a previous image that represents the same terrain when viewed in the Near field.
- Training and then applying the Near field classifier to the whole scene.

In the above approach, errors in the Now field classifier can be propagated into the Near field classifier. Additionally, Far field imagery is classified according to a classifier trained on Near field appearances. A way of managing these limitations is described below and an advantage of the approach followed in some embodiments is that hundreds or thousands of training images can be generated as opposed to the tens of images generated through hand-labelling.

Figure 2:
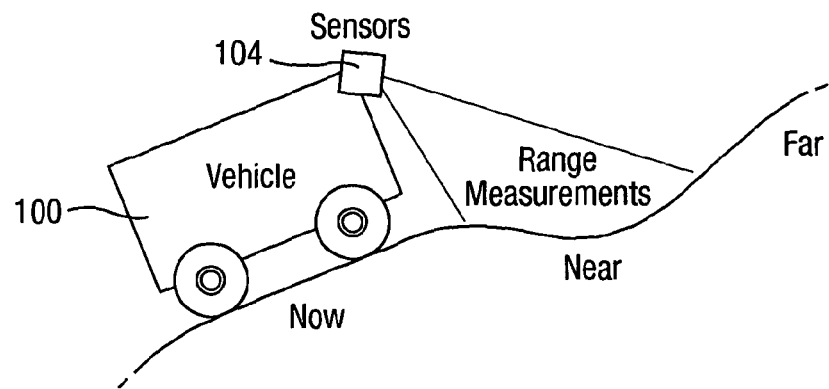
FIG. 2 shows a vehicle progressing over terrain divided into Now, Near and Far fields.

Referring to FIG. 2, as mentioned above, embodiments of the system can be based on dividing the world around the vehicle into areas based on distance, in particular Now, Near and Far fields. The Now field relies on proprioceptive sensors, the Near field on exteroceptive range and appearance sensors, and the Far field on appearance sensors, but usually no explicit range measurements. Perceptions based on interpretations of sensor measurement and the perception system need to include useful estimates of terrain characteristics at a range that enable the vehicle to plan paths to efficiently negotiate the environment (or assist with guiding the vehicle through the environment). For full-scale high-autonomy vehicles, this can imply a distance in the range of (low) hundreds of meters.

The terrain the vehicle is currently traversing is referred to as the Now field. The response of the vehicle to the Now field can be measured through onboard proprioceptive sensors, such as accelerometers. Interpreting the resulting signals can be achieved with different techniques. Embodiments of the present system use a Gaussian Process classification technique (see, for example, Carl Edward Rasmussen and Christopher K. I. Williams, 2006, *Gaussian Processes for Machine*

*Learning*, The MIT Press, ISBM 0-262-18253-X) that uses variance, auto-correlation, range, number of mean transitions and mean of both pitch and roll signals over time as features. As an example, the confusion matrix indicated an accuracy of around 94% when testing between gravel and tarmac terrains with an associated kappa statistic of 87.7%. An advantage of using a Now field classifier is the ability to automatically generate labels for terrain which can be used in supervised training for other aspects of the system, thereby avoiding the need for hand-labelling. This therefore enables, for example, experiments to be conducted on hundreds and thousands of frames, as opposed to the tens of frames that hand labelling typically provides. However, as the Now field classifier may not be 100% accurate, this can introduce errors into the system. One way of managing these errors is to pass probabilities, rather than labels, to the visual classifier.

The Near field is the area of terrain just ahead of the vehicle. The Near field extent can be taken to be the range for which dense point cloud data is unavailable. This range will depend on the type of sensors used and may be set by fundamental limitations in sensing technology, for example around 10-20 m for off-the-shelf stereo cameras. The Near field data can be used to find the surface geometry of local terrain and the terrain type, e.g. tarmac, dirt, etc., which are key factors affecting ground vehicle mobility.

Modelling of terrain geometry is often achieved by meshing 3D points using well-known methods such as Delauney triangulation. Although meshing arguably provides a good estimate, it does not explicitly model uncertainty. This is especially problematic in sparsely sampled areas, where large interpolations are made.

Some embodiments of the present system utilise Gaussian Processes (GP) as a method of modelling the surface geometry of local terrain, but other embodiments comprise a system based on the NURBS Kalman Filter representation (see, for example, L. Piegl, W. Tiller, 1997, *The NURBS Book*, Springer-Verlag). The computational cost of GPs is generally higher than NURBS Kalman Filter representation, although incremental GP update methods may improve performance. The NURBS-KF approach is capable of providing principled uncertain estimates of real-world terrain geometry in real-time.

Different methods of terrain type labelling are available, including ones based on a method described in S. Thrun et al, *Winning the DARPA Grand Challenge*, 2006, Journal of Field Robotics, which involve an appearance model of terrain being learned online. The performance of this approach may be improved by some changes, e.g. operating in HSV space; use of mean-shift clustering instead of k-means; use of Euclidian distance instead of Mahalanobis (which can significantly reduce the computational cost with little apparent degradation in performance), and use of an additional model to model off-track (which can enable test pixels to be classified according to their closest matching class, not simply their distance from a single class). An alternative approach is to treat the probabilities generated by the Now field classifier as a regression problem. This can produce a method that predicts class membership probabilities based on visual input and has the advantage of maintaining a probabilistic output.

The higher level observations, e.g. surface geometry and surface type, can be used to reason over the terrain to infer drivability. Reasoning engines can use these higher level observations as inputs. From the NURBS-KF modelling of the terrain geometry, it is possible to extract the gradient and curvature of the surface at any point. This enables prediction of static roll-over points and this surface model can be used to influence local path planning in real-time.

Figure 3:
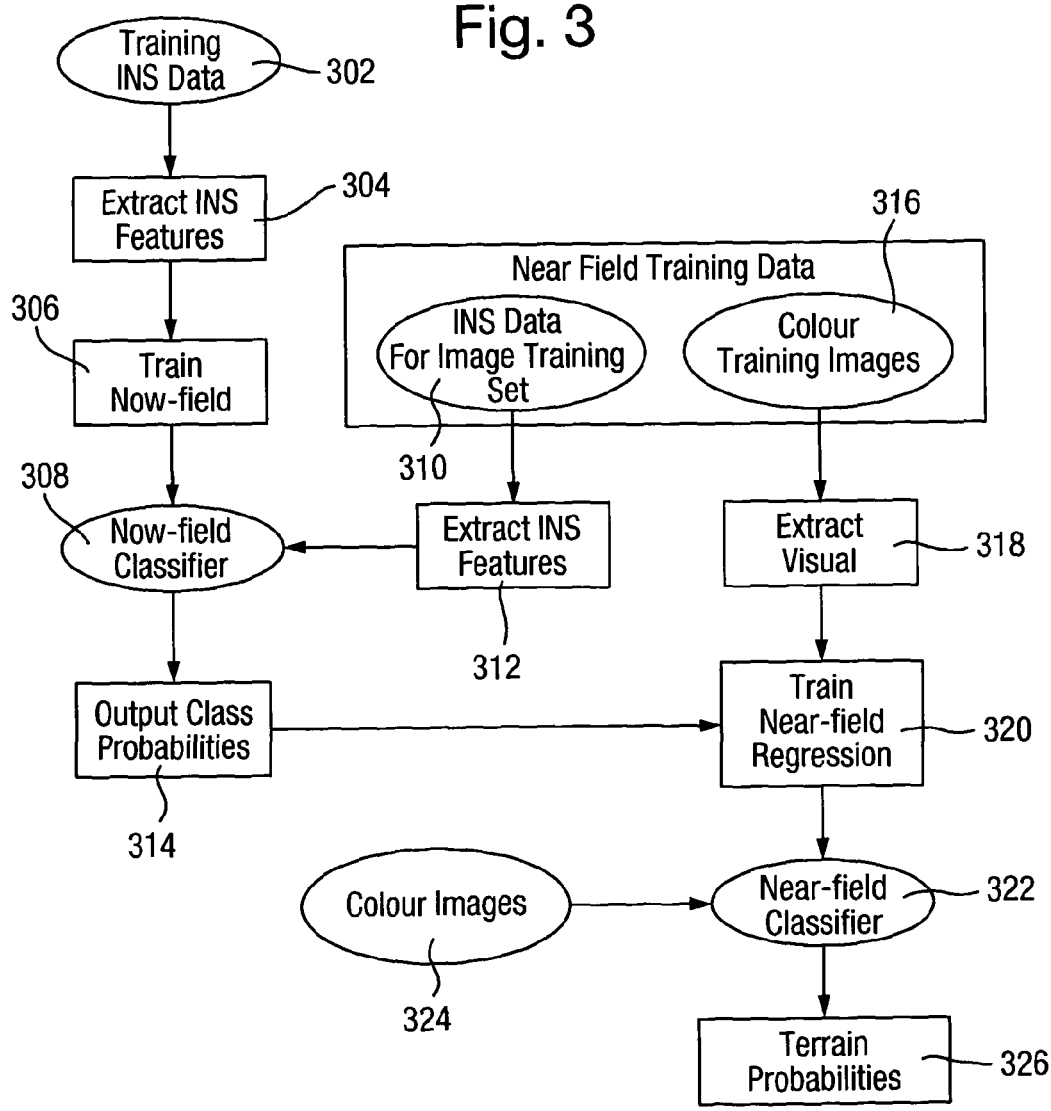
FIG. 3 schematically illustrates steps involved in producing trained Now and Near field classifiers.

FIG. 3 shows steps carried out by a processor configured to perform part of the terrain perceptions functionality, in particular producing trained Now and Near field classifiers. At step 302, data, typically sourced from a navigation system onboard the vehicle and primarily relating to data from sensors measuring characteristics of its Now field, is obtained. At step 304, terrain and vehicle state characteristics are extracted from the obtained data. Examples of the type of characteristics used include speed, pitch, roll and yaw measurements over time. The dataset used in one example consisted of three different terrain types: gravel, concrete and tarmac.

At step 306, a Now field classifier is trained to classify terrain based on the extracted characteristics. The training of the Now field classifier may also require hand-labelled data; however, the production of this data can be trivial as it involved collecting data sets where the vehicle only traversed a single terrain type. In some embodiments, the Now field classifier trained at step 306 can be produced from one or more Gaussian Process (GP) classifiers. One GP for each of the three example terrain types was used in the example and so each GP could be considered as a binary classifier for each terrain, e.g. tarmac or not tarmac. The navigation data features used include the variance, auto-correlation, range, number of mean transitions, and mean of both pitch and roll signals over a second of time.

The trained Now field classifier, shown schematically at 308, is capable of outputting probabilities of each terrain, which can be output as a vector [p(concrete), p(gravel), p(tarmac)] and normalised. The classifier could effectively be forced to select a single class as output, i.e. a discriminative approach, by simply outputting the terrain that was classified with the highest probability. Adopting this approach in experimental trails on test data produced an accuracy of around 94% and so the performance of the discriminative form of the Now field classifier may be considered reasonable but including errors. Since the output of the Now field classifier is to be used to train the Near field classifier, the possible knock-on effects were considered and the inventors decided that the Now field classifier should, rather, output the probabilities of the terrain being analysed belonging to each terrain type. This can provide the benefit of retaining information, i.e. the raw probabilities, and it was also recognised that any system requiring discriminative input could easily generate one from the raw probabilities.

To train the Near field classifier, navigation system data for corresponding images are collected into a training set. The training of the Near field classifier also involves image-based data 316 that corresponds to the Near field navigational data 310. As no labels are usually attached to the visual features of data in the Near field training, classical classifiers could not be used for the Near field classifier. As a result, a regression method is used to create the Near field terrain classifier. This can be done by associating the navigational data 310 from a dataset with the corresponding image-based data, extracted from image data at step 318. For example, a rectangle of the image taken from just in front of the vehicle can be matched with the navigational data measured when the vehicle actually reached that section of terrain. At step 312 terrain and vehicle state characteristics are extracted from the obtained data. The extracted characteristics will usually be the same as the ones extracted at step 304 for the Now field data.

The characteristics data 312 are passed into the trained Now field classifier 308 to produce the vector of terrain type probabilities for the rectangle. The results of its classification, which comprise the probabilities of the terrain belonging to particular classes (shown schematically at 314) can then be used, along with the visual feature data extracted at step 318, to provide training data for training the Near field classifier at step 320. Thus, the probabilities generated by the first classifier 308 are used for the learning of the second classifier 322, resulting in an end-to-end probabilistic system. For example, if the first classifier generates output indicating that the terrain being analysed has a 90% probability of being tarmac and a 10% probability of being gravel then this helps the second classifier learn the terrain type of corresponding image data.

A radial basis function regression method can be used to link the probabilities and corresponding visual features. The method of finding the visual features can involve segmenting the image and then extracting features from these segments. The features extracted can be seen in the table below. The features were chosen as the best to differentiate the classes after an investigation was done on possible features. The investigation involved plotting the histogram of the responses of each feature to images of each class. The features chosen had histograms which were thought to have responses that were easily separated.

| Metric | Channel | Texture |
| --- | --- | --- |
| Variance | Normalised Red | No |
| Variance | Normalised Green | No |
| Variance | Saturation | No |
| Variance | Value | No |
| Mean | Saturation | Laws texture L, L |
| Mean | Value | Laws texture L, L |
| Mean | Red | Laws Texture L, L |
| Mean | Green | Laws texture L, L |
| Mean | Normalised blue | Laws texture R, L |

When a new image 324 is passed into the trained Near field classifier 322, the visual features are extracted and the classifier produces an indication, shown schematically at 326, of the probability of that terrain belonging to a terrain type. The output from the classifier can be bounded to be between 0 and 1. If the value predicted is above or below this region it can be treated as being 0.

Figure 4:
FIGS. 4, 5 and 6 are graphical representations of results produced by embodiments of the system.
Figure 4:
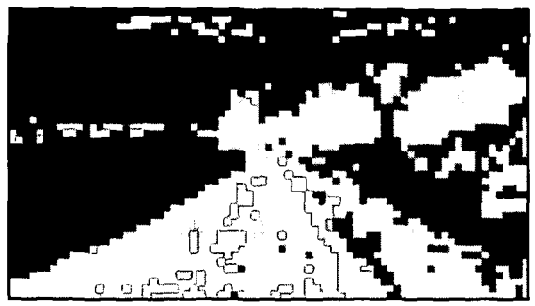
Figure 4:
Figure 4:
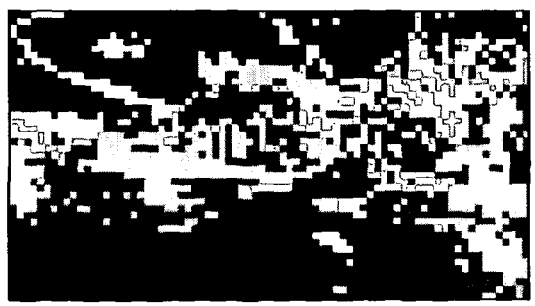
Figure 4:
Figure 4:
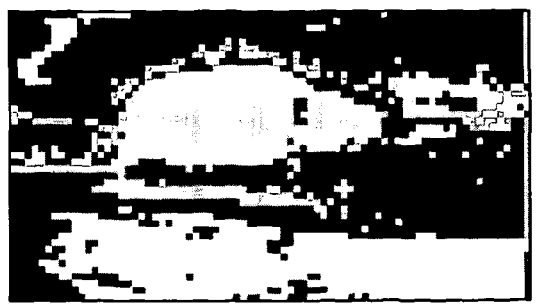
Figure 4:
Figure 4:
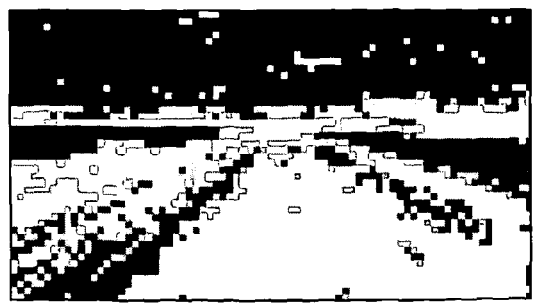

Discriminative results from this method can be seen in FIG. 4, which shows images taken from a gravel track data set and the corresponding labelled image, shown in greyscale. The label for the terrain was taken to be the terrain with the highest probability.

Although the discriminative method of inferring a label works reasonably well, this method loses information about the terrain. For example, there is no indication of situations where the second highest probability is close to the one chosen. As can be seen in FIG. 4C, the second concrete example, a majority of the terrain is mislabeled as tarmac, which could be due to the significant change in lighting. However, if the values of the output probabilities are considered then it can be seen that the tarmac does have a higher probability but the classifier it is not very confident about tarmac as a label.

Figure 5:
Figure 5:
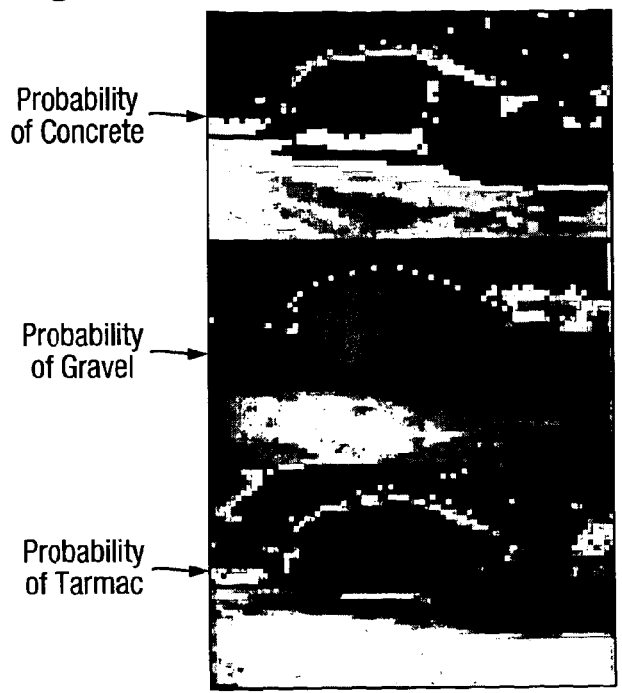
Figure 6:
Figure 6:
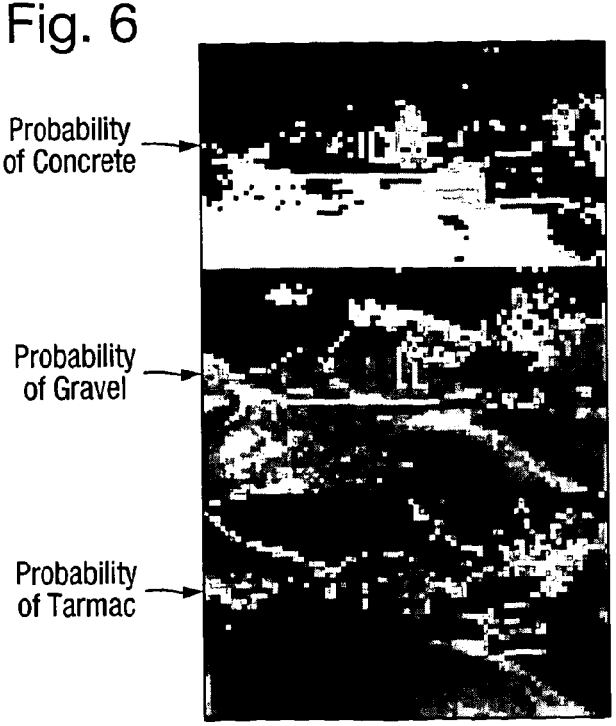

The probabilities of each terrain type are presented visually in FIG. 5, where the whiter the segment, the higher the probability value. This shows that if the highest probability were taken as a label, in the second concrete example, then the terrain would be miss-labelled as Tarmac, even though there is low confidence in Tarmac as a label (shown as not very white) and there is an almost even split between all three terrains. Whereas in the first Concrete Track example (FIG. 4A)) there is a high probability of the ground being Concrete as can be seen in FIG. 6.

As discussed above, embodiments of the invention include a drivability engine that can produce a drivability measure. The drivability engine can provide a means to predict the response of the vehicle on upcoming terrain. This is a complex problem and the approach taken in some embodiments is to identify key drivability metrics: e.g. speed, slip and vibration. These were identified because, from an autonomy point of view, they are the metrics over which reasoning usually takes place. In some embodiments, the prediction was limited to vibration only, but it will be understood that other factors, such as slip, can be taken into account in other embodiments. The drivability engine can take in measurements from any sensor, not just the terrain perceptions, and produce a measure of drivability.

The drivability measure is produced by a Bayes network in some embodiments. A Bayes net was chosen by the inventors because it is a probabilistic method and it is flexible in how it can be trained as it gives the option to train over data, or to use expert knowledge. Initially, the inventors considered having the Drivability of an area as a node in the Bayes net; however, it was found that Drivability was difficult to define and could not be measured directly. This lead the inventors to consider a two-layer Bayes net, with the first layer made up of nodes that can be directly measured and as such this layer can be trained on actual data from sensors onboard the vehicle. These nodes can include the drivability metrics described above and the output from the Near field terrain classifier.

Figure 7:
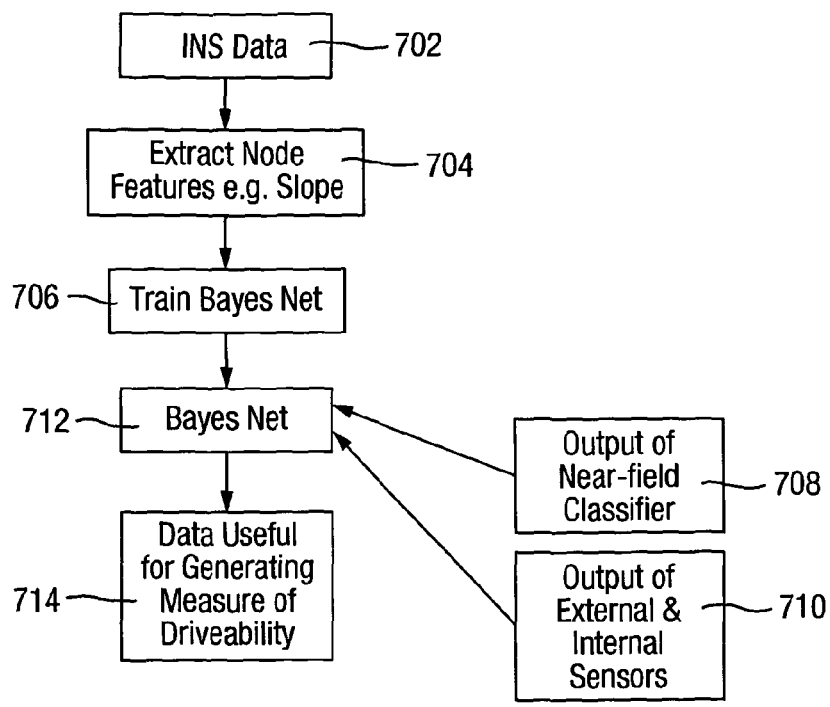
FIG. 7 schematically illustrates steps involved in operation of a Drivability engine.

Referring to FIG. 7, steps relating to the operation of the Drivability engine are shown. At step 702 navigational data is obtained and at step 704 terrain and vehicle state characteristics are extracted. As step 706 the extracted characteristics are used to train a Bayes net in a known manner.

The output 708 from the Near field classifier and the corresponding readings 710 from relevant sensors (e.g. upcoming terrain slope or weather conditions) can be measured and passed into the trained Bayes network 712 as evidence when using it to predict terrain/vehicle response characteristics. As the Bayes net has been trained on data to learn relationships between all of the input evidences, e.g. weather, terrain, pitch, slip, etc., it can produce, at step 714, data useful for generating a measure of drivability, including probability distributions (predictions) of nodes which have not been observed (have no evidence). The use of a Bayes net allows prediction of multiple parameters, e.g. slip and vibration, simultaneously, based on any subset of its nodes, including type/visual appearance of the terrain in embodiments where such parameters are used as nodes in the net.

In one embodiment, the Nodes for the Bayes net and their categories were identified as:
1. Weather (rain, sunny, cloudy)
2. Terrain (gravel, concrete, tarmac)
3. Slope Pitch (low, med, high)
4. Slope roll (low, med, high)
5. Radius of curvature (low, med, high)
6. Speed (low, med, high)
7. Vibration Roll (low, med, high)
8. Vibration Pitch (low, med, high)

The internal tables for the Bayes net can be learnt from a data set. This data set can be the same as the one used for the terrain classification discussed above and the data for each node can be derived from the raw navigational data and the images. The example data set consisted of gravel, tarmac and concrete. The Weather and Terrain were constant for each track in the example. The rest of the data can be calculated from the navigational data, which was split into sections of a second long. The Slope Pitch and Slope Roll were taken to be the maximum value of the pitch and roll measured by the navigational system sensors during each second.

The Radius of curvature can be calculated by taking the position data from the INS for a second segment and fitting a curve to the points. Using the equation for this curve, the radius of curvature was calculated from the equation below:

$$Radius of curvature = \frac{\left[1+\left(\frac{dy}{dx}\right)^2\right]^{3/2}}{\left|\frac{d^2y}{dx^2}\right|}$$

Speed can be measured directly from the navigational system and the vibration for both pitch and roll were defined in this implementation as the ratio of the mean and the variance over the second. All of the data for each node can then be discretised by thresholding the values into a low, medium or high category. The thresholds for most nodes were decided after consulting an expert, but the thresholds for the vibration were chosen to give an equal split between high, medium and low. This was done to create a difficult task for the Bayes net in the example embodiment; if the Bayes net performed well in this scenario it would give more weight to the results.

Figure 8:
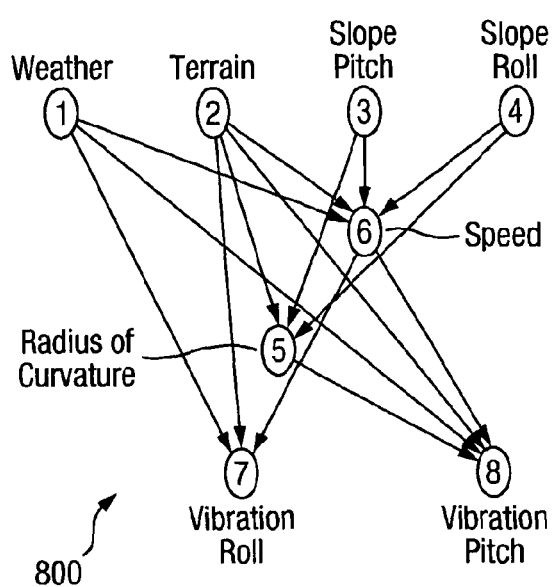
FIGS. 8 and 9 illustrate schematically Bayes nets used in implementations of the Drivability engine.

Before this data could be used to train the tables in the Bayes net, the structure of the net is created. Two methods for creating the structure were implemented and compared by the inventors. The first method used experience of the vehicle system to infer what links should exist. For example, weather affects the speed of the vehicle; there is a tendency to drive slower in rain. This structure will be referred to as the experience structure. The structure of the experience Bayes net 800 can be seen in FIG. 8, using the same numbering as the above node list.

The inclusion of the output from the Near field classifier into the Bayes net for the first layer can be straightforward. This layer can also predict the distribution of the values of any missing sensor readings at a given time. From this the inventors believed that the first layer may be able to predict internal vehicle measurements, such as vibration, that cannot be measured before a vehicle reaches a terrain but are useful for deciding terrain drivability.

Figure 9:
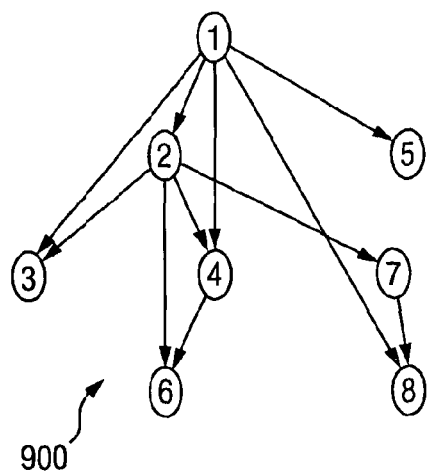

The second method considered by the inventors was to learn the structure of the Bayes net from the training data. The resulting structure 900 can be seen in FIG. 9. This structure depends on the data given to the structure learning function.

The second layer of the Bayes net can be expertly trained to produce a measure of drivability based on the nodes, or a subset of the nodes, included in the first layer. An example question to be answered by the experts is, "Given you know the speed of the vehicle, the terrain, weather, etc., would you class this situation as high drivability, medium drivability or low drivability?" The second layer does not necessarily need to be a Bayes net.

The invention claimed is:

1. A method of controlling a vehicle over terrain, the method comprising:
    training at least one first classifier technique using a first set of terrain classifier training data and a plurality of Gaussian Process techniques, the training data including two or more different types of data collected by two or more different types of sensors that measure an internal state of the vehicle such that the at least one first classifier technique is trained to output probability values associated with each of a plurality of different types of terrain classifications;
    using the probability values associated with each of the plurality of different types of terrain classifications to generate a second set of terrain classifier training data; and
    training a second classifier technique using the probability values associated with each of the plurality of different types of terrain classifications of the at least one first classifier technique for the second set of terrain classifier training data, and additional data including an image-based representation of the terrain of the second data set, such that the second classifier technique is trained to output a probability value useable to classify terrain.

2. A method according to claim 1, wherein the first terrain classifier training data set comprises data extracted from terrain sensors on board a vehicle.

3. A method according to claim 1, wherein the second classifier technique comprises a Regression Model technique.

4. A method according to claim 3, wherein the second classifier technique comprises a Radial Basis function technique.

5. A method according to claim 1, wherein the first terrain classifier training data set comprises terrain data from a Now field of a vehicle.

6. A method according to claim 5, wherein the first terrain classifier training data set comprises data selected from a set including: speed, pitch, roll and yaw measurements over time.

7. A method according to claim 1, wherein the second terrain classifier training data set comprises terrain data from a Near field of a vehicle.

8. A method according to claim 1, comprising:
    using an output from the second trained classifier technique to create a node in a Bayesian Network configured to provide data useful for generating a measure of traversability of terrain.

9. A method according to claim 8, wherein the output of the second classifier technique is used by the Bayesian network to predict terrain type.

10. A method according to claim 8, wherein the Bayesian Network includes nodes corresponding to at least one terrain characteristic and at least one vehicle state characteristic.

11. A method according to claim 10, wherein the nodes are selected from group consisting of: weather; terrain type; slope pitch; slope roll, vehicle speed; radius of curvature; slip; vibration roll and/or vibration pitch.

12. A system configured to assist vehicle guidance over terrain, the system comprising:
    a component adapted to train at least one first classifier technique using a first set of terrain classifier training data and a plurality of Gaussian Process techniques, the training data including two or more different types of data collected by two or more different types of sensors that measure an internal state of the vehicle, such that the at least one first classifier technique is trained to output probability values associated with each of a plurality of different types of terrain classifications;
    a component adapted to use probability values associated with each of the plurality of different types of terrain classifications to generate a second set of terrain classifier training data; and
    a component adapted to train a second classifier technique using the probability values associated with each of the plurality of different types of terrain classifications of the at least one first classifier technique for the second set of terrain classifier training data, and additional data including an image-based representation of the terrain of the second data set, such that the second classifier technique is trained to output a probability value useable to classify terrain.

* * * * *